United States Patent
Lawson et al.

[11] Patent Number: 6,152,227
[45] Date of Patent: Nov. 28, 2000

[54] DRILLING AND CEMENTING THROUGH SHALLOW WATERFLOWS

[75] Inventors: Jimmie B. Lawson, Houston; Donald L. Whitfill, Kingwood, both of Tex.

[73] Assignee: Baroid Technology, Inc., Houston, Tex.

[21] Appl. No.: 09/176,180

[22] Filed: Oct. 21, 1998

Related U.S. Application Data

[60] Provisional application No. 60/063,379, Oct. 24, 1997.

[51] Int. Cl.$^7$ ............................. E21B 33/13; C09K 7/00
[52] U.S. Cl. ............................. 166/293; 175/72
[58] Field of Search ............................. 166/285, 292, 166/293; 175/72; 106/706, 790, 718, 708, 789, 719, 705

[56] References Cited

U.S. PATENT DOCUMENTS

| | | | |
|---|---|---|---|
| 3,363,689 | 1/1968 | Smith et al. | 166/29 |
| 3,774,683 | 11/1973 | Smith et al | 166/293 |
| 3,804,058 | 4/1974 | Messenger | 166/292 |
| 5,295,543 | 3/1994 | Terry et al. | 166/293 |
| 5,327,968 | 7/1994 | Onan et al. | 166/293 |
| 5,355,954 | 10/1994 | Onan et al. | 166/292 |
| 5,358,044 | 10/1994 | Hale et al. | 166/293 |
| 5,361,842 | 11/1994 | Hale et al. | 166/293 |
| 5,398,758 | 3/1995 | Onan et al. | 166/292 |
| 5,399,195 | 3/1995 | Hansen et al. | 106/701 |
| 5,421,409 | 6/1995 | Mueller et al. | 166/292 |
| 5,439,518 | 8/1995 | Francis et al. | 106/705 |
| 5,458,195 | 10/1995 | Totten et al. | 166/293 |
| 5,484,019 | 1/1996 | Griffith | 166/293 |
| 5,569,324 | 10/1996 | Totten et al. | 106/696 |
| 5,580,379 | 12/1996 | Cowan | 106/789 |
| 5,585,333 | 12/1996 | Dahl et al. | 507/103 |
| 5,711,383 | 1/1998 | Terry et al. | 175/72 |
| 5,716,910 | 2/1998 | Totten et al. | 507/102 |
| 5,807,810 | 9/1998 | Blezard et al. | 507/103 |
| 5,820,670 | 10/1998 | Chatterji et al. | 106/727 |
| 5,851,960 | 12/1998 | Totten et al. | 507/118 |
| 6,016,872 | 1/2000 | Davis | 166/312 |

FOREIGN PATENT DOCUMENTS

| | | |
|---|---|---|
| 0 802 253 A1 | 10/1997 | European Pat. Off. . |
| WO 91/18077 | 11/1991 | WIPO . |
| WO 93/11202 | 6/1993 | WIPO . |
| WO 93/18111 | 9/1993 | WIPO . |
| WO 96/40599 | 12/1996 | WIPO . |
| WO 97/22677 | 6/1997 | WIPO . |

OTHER PUBLICATIONS

Forta Corporation brochure, including Fact Data and Specification on Super–Sweep (Trademark) Fiber (date unknown)

Dwight K. Smith, Cementing, Henry L. Doherty Memorial Fund of AIME, Society of Petroleum Engineers, Revised Edition, Second Printing 1990 (Richardson, Texas and New York City, NY) pp. 34–37.

Halliburton Services Cementing Technical Data concerning composition of Tuf Cement (Trademark), date unknown.

*Primary Examiner*—David Bagnell
*Assistant Examiner*—Jennifer R Dougherty
*Attorney, Agent, or Firm*—Craig W. Roddy; Karen B. Tripp

[57] ABSTRACT

Drilling fluids are designed for drilling and cementing through shallow water flows and unconsolidated formations. Such drilling fluids utilize hollow microspheres to increase the volume of the drilling fluid without adding too much weight to the drilling fluid. The drilling fluid is also designed to employ an admixture of silicate, high surface area fibrous material, deformable graphite particles, and an activatable cementitious material to stabilize unconsolidated formations and form a tough filter cake that will bond with the cement casing.

19 Claims, No Drawings ics. 6,152,227

DRILLING AND CEMENTING THROUGH SHALLOW WATERFLOWS

RELATED APPLICATION

This application is a continuation-in-part of U.S. Provisional Patent Application Ser. No. 60/063,379 filed on Oct. 24, 1997.

TECHNICAL FIELD OF THE INVENTION:

The present invention relates in general to a composition of matter and a method of using such composition in drilling and cementing operations and more particularly relates to a drilling fluid system and method of using the drilling fluid system to facilitate the drilling of a borehole through shallow waterflows and unstable unconsolidated formations and cementing of casing through the unstable area of the borehole.

BACKGROUND

For many years petroleum companies concentrated on developing oil and gas fields on land. But the world's appetite for energy sources, coupled with diminishing returns from land drilling, has driven petroleum companies to develop offshore reserves.

Sub-sea geologic sediments and structures are often similar and in some cases superior to geologic conditions that have proven highly productive on land. In fact, offshore reserves have been estimated at 21% of the world's proven reserves, with estimates that 40% to 50% of all future resources will come from offshore reserves.

Drilling offshore wells in deep water, greater than about 600 feet of depth, creates its own set of problems. When drilling on the edge of the continental shelf, quite frequently, geo-pressured, water-bearing sands also known as shallow water flows (SWF) are encountered at about 1000 to 2000 feet below the mud line. The depth of these sands and the pressures that they exhibit create problems for well operators.

One of the problems faced by the operators is the nature of the sands that are associated with SWF. These sands are thought to be made primarily of quartz. The grains of sand are believed to be rounded, well sorted, and have an average grain diameter of 100 microns or more. These grains of sand are loosely packed and unconsolidated, similar to the sand found on beaches and on river sand bars, thereby contributing to the instability of the formation.

Perhaps the greatest challenge faced by the operators drilling offshore wells is to control the formation pressure throughout the drilling and cementing process. Typically drilling fluids are weighted to increase the density of the drilling fluid in order to inhibit the flow of water from the formation into the borehole. However, in areas of SWF there is only a narrow range of drilling fluid densities that can be used to control the formation pressure of the wellbore.

If the drilling fluid is too light, water will flow into the well and can result in the well washing out. Early on, operators thought it might be okay to let some of the water flow into the well to relieve pressure on the aquifer. Experience has proven, however, that once water begins flowing into a well, it is hard to regain control of the well, and, typically, a well ends up being washed out and lost.

On the other hand, if the drilling fluid is too heavy the pressure in the wellbore may exceed the fracture pressure in the sands leading to the fracturing of the formation. Once a fracture has been induced, the fracture will typically widen and may even grow into the next well in a template. In addition, these fractures can be reopened at lower circulating pressures during subsequent drilling prior to casing off the formation. As fractures are formed and widened more and more drilling fluid is lost to the formation, causing a massive loss of circulating drilling fluids.

If the annulus of the borehole does not remain full of drilling fluid, the hydrostatic pressure within the borehole may decrease until the formation fluids, previously controlled by the drilling fluid hydrostatic pressure, are allowed to flow into the borehole. The end result can be a kick, a blowout, or previously stable formations can collapse into the borehole. Borehole collapse results in severe wash-outs and borehole enlargement to the extent that it may not be possible to continue drilling.

Furthermore, if the drilling fluid is circulated to the drilling rig at the surface, the weight of the column of drilling fluid being circulated to the surface adds to the hydrostatic head of pressure at the wellbore and limits the weight and, consequently, the composition of the drilling fluid that can be used. Thus, two methods of drilling off shore wells have been developed. These two methods are called riserless drilling and drilling with a riser.

A riser is a piece of casing that connects the sub-sea well to the drilling rig and allows one to circulate drilling fluid to the surface. During riserless drilling, drilling fluid is used for a single pass through the wellbore and is then discharged directly to the sea floor. If one drills riserless in areas having SWF, drilling fluid weights of about 11 to 12 lbs/gal are required. The desirable drilling fluid weight depends on the environment of the well, including the water depth and the depth below the mud line of the SWF.

Controlling the density of the drilling fluid in riserless drilling is more difficult because the drilling fluid transports cuttings and drill solids and there is no way to determine how many of these there are in the drilling fluid at any one time. Furthermore, riserless drilling requires large volumes of drilling fluid. Often, riserless drilling requires more fluid than can be stored on a drilling rig and subjects the drilling process to interruptions due to bad weather and the disruption of supply boats delivering drilling fluid. The direct discharge of large volumes of cuttings and drilling fluids on the sea bed may raise environmental questions. For riserless drilling, operators use simple muds: this is both for reasons of cost and environmental concerns. Mixed metal silicate muds and calcium chloride brines are examples of muds suitable for riserless drilling of SWF.

Drilling with a riser provides more flexibility in selecting the optimum drilling fluid components. However, the additional hydrostatic pressure provided by the column of drilling fluid rising to the surface leads to the critical question: "How does one formulate a fully functional drilling fluid and remain below drilling fluid weights that propagate fractures?" Drilling fluid weights for drilling SWF with a riser should be in the range of about 8.5 to about 10 lbs/gal. Again, the desirable drilling fluid weight depends on water depth and depth below the sea-floor of the SWV. To date it has been difficult and sometimes impossible to formulate a fully functional drilling fluid while maintaining a drilling fluid of the required light weight.

SUMMARY OF THE INVENTION

The invention contemplates a drilling fluid system and method of using the fluid of the present invention to provide stability to the formation by placing a unique composition of materials in the area of instability to inhibit and prevent the flow of water into the borehole to inhibit formation fracture growth, and to facilitate drilling and cementing operations.

In accordance with one aspect of the invention, a composition is designed for drilling through shallow water flow (SWF) by combining a fibrous material, a silicate material, a graphite material, a light weighting material and a cementitious material, wherein the components of the composition work together to consolidate the filter cake and prevent the loss of fluids from the wellbore.

The invention includes a drilling fluid for drilling through SWF comprising silicate, blast furnace slag, cellulose microfibers, hollow microspheres and graphite particles.

Additional features and advantages of the drilling fluid system designed for drilling and cementing through SWF will be described hereinafter. It should be appreciated by those skilled in the art that the concept and the specific embodiment disclosed may be readily utilized as a basis for modifying or designing other processes or compositions for carrying out the same purpose as the present invention. It should also be realized by those skilled in the art that such equivalent constructions do not depart from the spirit and scope of the invention as set forth in the appended claims.

DETAILED DESCRIPTION OF THE INVENTION

The present invention provides a composition of matter and a method of using such composition for drilling a borehole through SWF and unstable unconsolidated formations and cementing casing through the unstable area of the borehole.

As petroleum companies have turned to developing offshore oil and gas reserves, they have been faced with a number of problems. For example, a number of offshore wells have been lost due to shallow water flows (SWF).

A drilling fluid is a liquid circulated through the wellbore during rotary drilling operations. In addition to its finction of bringing cuttings to the surface, the drilling fluid cools and lubricates the bit and drill stem, protects against blowouts by holding back subsurface pressures, and deposits a filter cake on the wall of the borehole to prevent loss of fluids to the formation. Drilling fluids are formulated to maintain the hydrostatic pressure within the wellbore necessary to prevent water flow into the wellbore.

Areas of SWF present a challenge in the design of appropriate drilling fluids because there is only a narrow pressure window between maintaining the required borehole hydrostatic pressure and inducing fractures in the formation. The appropriate drilling fluid weight depends on a number of variables including water depth and the depth below the sea bed where the SWF and unconsolidated sand are found. Drilling fluids are formulated to meet the requirements of the well site. The present invention comprises a number of ingredients or elements that work together to control SWF.

Broadly, one embodiment of the present invention includes a suspension medium, lost circulation materials, light weighting materials, and filter cake reinforcement materials.

Drilling fluids should provide a suitable suspension medium for suspending the particulates added to the drilling fluid as lost circulation materials, as well as suspending the bit cuttings in the drilling fluid as it is circulated to the surface. Materials used to adjust the carrying capacity, and suspending capacity, of the drilling fluid include without limitation hydroxyethyl cellulose, welan gum, guar gum, Xanthan gum, polyacrylamide/polyacrylate, or carboxymethyl cellulose.

Drillers often encounter zones that accept large volumes of drilling fluid due to fractures, coarse sand, gravel, or other formations. To control severe drilling fluid losses, operators circulate sized solids suspended in the drilling fluid. These solid particles are used to bridge and seal very permeable formations and to promote tip screen out and prevent fractures from growing. Such solids are referred to as lost circulation materials.

In a preferred embodiment of the present invention, fibrous materials having a high surface area are used to bind the unconsolidated sands and contribute to the deposition of a tough filter cake on the surface of the borehole. Cellulose microfibers are preferred but other fibers with similar characteristics, such as glass microfibers, can be used. Cellulose microfibers also help viscosily the drilling fluid and contribute to the carrying and suspension capacity of the drilling fluid.

Drilling fluids suitable for use in SWF may also contain deformable graphite particles and/or an hydratable clay. Graphite particles and clay can work with high surface area cellulose fibers to seal highly permeable formations and to promote fracture tip screen outs. Thus, the graphite particles and the clay can help heal fractures and prevent the lost fluid circulation. Preferred embodiments of the present invention may include one or more of these materials. STEEL SEAL from Superior Graphite is apreferred deformable graphite for inclusion in the drilling fluid and prehydrated bentonite is a preferred clay for the drilling fluid systems.

As discussed above, it is difficult to formulate a drilling fluid with the appropriate density for drilling through SWF having a weight from about 8.5 to about 10 lbs/gal. Fully functional drilling fluids for riserless drilling through SWF are typically weighted from about 10 lb/gal to about 12 lb/gal, but in drilling operations using a riser such weights would often induce fracturing. Therefore, the density of the drilling fluid must be controlled with light weighting materials such as hollow glass, or ceramic, microspheres.

SWF have fracture gradients that barely exceed their pore pressures. Successful drilling through SWF depends on being able to add enough weight to stabilize the borehole without exceeding the formation fracture gradient. Since the hollow microspheres are lighter than water, they can be used to formulate drilling fluids with concentrated chemical components having weights that do not exceed the formation fracture gradient. A preferred embodiment of the present invention uses hollow glass microspheres, having specific gravities ranging from about 0.125 to about 0.6, to increase the volume of the drilling fluids, without adding too much weight to the drilling fluid. The hollow microspheres may also be used to control the weight of cementing compositions used in casing unstable areas of the borehole.

Preferred embodiments of the drilling fluid system also include an activatable fast-setting cementitious material. A variety of cementitious materials can be utilized in the drilling fluid. Examples of such materials include Portland cement, fly ash, blast-furnace slag (BFS) and mixtures thereof. Preferred embodiments of the drilling fluid system include BFS in the drilling fluid.

The inclusion of BFS in the drilling fluid assists the other components of the drilling fluid in binding unconsolidated sands and healing fractures. In addition, the inclusion of BFS in the drilling fluid and its incorporation into the filter cake on the surface of the wellbore increases the compatibility of the filter cake with cement. Thus, when the operator proceeds to cement the casing, the BFS in the filter cake will encourage the formation of a strong bond between the filter cake and the cement.

One advantage of BFS is that it is a latent hydraulic cementitious material that does not readily react with water and that can be activated when desired by a high pH environment. BFS hardens in a high pH environment (greater than or equal to a pH of 13). Thus, the pH of the drilling fluid can be maintained at a pH that is lower that the pH necessary to activate setting the BFS. By controlling the activation of the BFS, the operator can allow the BFS to be deposited in the filter cake before it is set. Once deposited the filter cake can be flushed with a high pH flush, generally consisting of a mixture of sodium hydroxide and sodium carbonate at a pH of about pH 14. The high pH flush hardens the BFS and assists in bonding the cement to the filter cake.

Desirable properties for drilling fluids used to control SWF include the use of light weight solids that build a tough, resilient filter cake and a filtrate that will produce a stabilizing gel in unconsolidated sands. The drilling fluid system of the present invention utilizes admixtures of materials that work together to accomplish the basic goals outlined above.

Some examples of drilling fluid systems that can contain the aforementioned additives include silicate systems, mixed-metal silicate systems and partially-hydrolyzed polyacrylamide (PHPA) systems. Silicate systems are preferred because they form gels and gelatinous precipitates when they encounter cations such as $Ca^{++}$, $Mg^{++}$ or $H^+$ in the wellbore. Silicates which are lost to the formation as filtrate encounter these cations, form gels in situ, and serve to strengthen unconsolidated formations near the wellbore. In addition, the inclusion of a silicate in the drilling fluid will enhance the bonding of the cement to the filter cake formed on the sides of the wellbore.

Examples of drilling fluid compositions suitable for drilling through SWF and the properties of those compositions appear in Tables 1 through 3. Testing of the drilling fluid compositions was in accordance with API RP 13B. In addition to the fluid loss tests using filter paper as described in RP 13B, fluid loss tests were also performed using ceramic disks with an average pore diameter of 35 microns. Tests using large pore ceramic disks were performed because the unconsolidated sands found in SWF are believed to have large pore diameters.

The examples given below are meant to be illustrative and not limiting.

TABLE 1

| | Shallow Water Flow Drilling Fluids Sample I. D. | | | | | | | |
|---|---|---|---|---|---|---|---|---|
| Constituents | 38J + 4' | 57' | 58' | 59'* | 60'* | 58" | 59"* | 60"* |
| BARASIL S,** bbl | 0.20 | 0.23 | 0.26 | 0.29 | 0.29 | 0.26 | 0.29 | 0.29 |
| BARAZAN PLUS,** ppb | 0.15 | 0.15 | 0.2 | 0.15 | 0.15 | 0.2 | 0.15 | 0.15 |
| N DRILL HB**, ppb | 0.5 | 0.5 | 0.5 | 0.5 | 0.5 | 0.5 | 0.5 | 0.5 |
| BFS, ppb | 25 | 25 | 25 | 25 | 25 | 25 | 25 | 25 |
| CITRIC ACID, ppb | 4 | 4 | 4 | 4 | 0 | 4 | 4 | 0 |
| CMC, ppb | 0.5 | 0.5 | 0.5 | 0.5 | 0.5 | 0.5 | 0.5 | 0.5 |
| FRESHWATER, bbl | 0.50 | 0.57 | 0.64 | 0.71 | 0.71 | 0.64 | 0.71 | 0.71 |
| MICROSPHERES, bbl | 0.3 | 0.2 | 0.1 | 0 | 0 | 0.1 | 0 | 0 |
| STEEL SEAL, ppb | 25 | 25 | 25 | 25 | 25 | 25 | 25 | 25 |
| PREHYDRATED BENTONITE | 5 | 5 | 5 | 5 | 5 | 10 | 10 | 10 |

*Control samples (59', 60', 59" and 60") contained no light weight hollow microspheres.
**BARASIL S, BARAZAN PLUS, and N DRILL HB are trademarks of Baroid Drilling Fluids, Inc.

TABLE 2

| | Characteristics of Drilling Fluids in Table 1 | | | | | | | |
|---|---|---|---|---|---|---|---|---|
| | Measurement Sample I.D. | | | | | | | |
| Characteristic Measured | 38J + 4' | 57' | 58' | 59' | 60' | 58" | 59" | 60" |
| Mud Weight, ppg | 8.6 | 8.83 | 9.5 | 10.1 | 10.2 | 9.6 | 10.2 | 10.25 |
| pH | 11.6 | 12.0 | 12.1 | 12.2 | 12.4 | 12.3 | 12.2 | 12.4 |

TABLE 2-continued

Characteristics of Drilling Fluids in Table 1

| | Measurement Sample I.D. | | | | | | |
|---|---|---|---|---|---|---|---|
| Characteristic Measured | 38J + 4' | 57' | 58' | 59' | 60' | 58" | 59" | 60" |
| FANN 35 READINGS | | | | | | | | |
| 600 | 242 | 120 | 60 | 38 | 31 | 112 | 98 | 92 |
| 300 | 196 | 86 | 42 | 23 | 19 | 87 | 73 | 72 |
| 200 | 162 | 69 | 35 | 17 | 14 | 78 | 67 | 65 |
| 100 | 128 | 58 | 18 | 11 | 9 | 68 | 51 | 53 |
| 6 | 89 | 23 | 6 | 4 | 2 | 45 | 34 | 30 |
| 3 | 62 | 19 | 4 | 3 | 1 | 39 | 30 | 29 |
| Plastic Viscosity, cp | 46 | 34 | 18 | 15 | 12 | 25 | 25 | 20 |
| Yield Point, lb/100 sq. ft. | 150 | 52 | 24 | 8 | 7 | 32 | 25 | 30 |
| 10 sec. gel. lbs./100 sq. ft. | 70 | 19 | 8 | 4 | 3 | 18 | 15 | 24 |
| 10 min. gel. lbs./100 sq. ft. | 85 | 41 | 9 | 11 | 7 | 32 | 25 | 30 |
| API FLUID LOSS | 4 | 4 | 7 | 8 | 9 | 6 | 8 | 8 |
| Fluid Loss-35 Micron Disk | 24 | 15 | 18 | 29 | 32 | 34 | 40 | 54 |

TABLE 3

Identification and Function of Fluid Constituents

| Constituent | Composition | Function |
|---|---|---|
| BARASIL S | A sodium silicate from Baroid Drilling Fluids, Inc. | Forms a gel to seal formation and improve compatibility with cement |
| BARAZAN PLUS | A biopolymer from Baroid Drilling Fluids, Inc. | Suspends solids at low shear |
| N DRILL HB | A high surface area cellulose from Baroid Drilling Fluids, Inc. | Reinforces filter cake to promote tip screen out and prevent fracture growth, also improves suspension capacity |
| BFS | Blast furnace slag | Consolidates filter cake and provides compatibility with cement |
| Citric Acid | Citric acid | Provides pH control and retards BFS set |
| CMC | Carboxymethyl cellulose | Retards BFS set |
| Microspheres | Hollow glass microspheres from 3M Corporation | Provides density control |
| STEEL SEAL | Deformable graphite particles from Superior Graphite | Controls fluid loss and promotes tip screen out |
| Prehydrated Bentonite | Prehydrated bentonite clay | Controls fluid loss in highly permeable formations |

The examples set forth above are illustrative of suitable drilling fluids for drilling through SWF. Numerous modifications and variations in the drilling fluid composition are possible in light of the above teachings. It is therefore understood that within the scope of the appended claims, the invention may be practiced other than as specifically described.

The use of the drilling fluid system described above in drilling through and cementing formations having SWF is set forth below. The first step in these drilling/cementing operations is to drill a borehole down to the top of the portion of the formation which contains the unstable sand or other unconsolidated material and to case the borehole to that point.

The drilling is then continued using the drilling fluid system of the present invention. In a preferred embodiment, the cellulose microfibers combine with the BFS, graphite particles, and formation sand (released by drilling) to form a tough, impermeable filter cake or mat. This mat, along with appropriate polymers, and perhaps silicate gel, stabilizes the running sand that is characteristic of SWF. Cellulose microfibers also work in conjunction with deformable graphite particles and clay to seal highly permeable formations and to limit fracture propagation.

Once the wellbore has been drilled to the desired depth, casing is set through the SWF and cemented in place using an activated, fast-setting cementitious material, such as BFS. A preferred embodiment of the cementing process utilizes a foamed cement or cement containing hollow glass microspheres for density control.

Well failure can occur during the cementing process, or later, if the cement casing is not well bonded to the filter cake. When BFS, or another activatable cementitious material, has been used in the drilling fluid and been incorporated into the filter cake, the cementitious material can be activated to harden and will enhance the bonding of the filter cake with the cement. One advantage of BFS is that its activation can be retarded at lower pHs throughout the drilling process and then it can be easily activated with a high pH flush just prior to the cementing process.

Numerous modifications and variations of the drilling fluid system and the use of the drilling fluid system in drilling and cementing through SWF are possible in light of the above teachings. It is therefore to be understood that within the scope of the appended claims that the invention may be practiced in a variety of embodiments.

What is claimed is:

1. A method for drilling a wellbore, which comprises the step of drilling through shallow water flows with a drilling fluid comprising:
    a fibrous material having a high surface area;
    a silicate material;
    a graphite material;
    a light weighting material; and
    a cementitious material which when deposited as part of a filter cake can be activated to harden and enhance the bonding of the filter cake to cement subsequently added to the wellbore.

2. The method of claim 1, wherein the fibrous material is cellulose microfibers.

3. The method of claim 1, wherein the light weighting material comprises hollow microspheres having a density less than water.

4. The method of claim 1, wherein the light weighting material comprises hollow glass microspheres having a specific gravity from about 0.125 to about 0.6.

5. The method of claim 1, further comprising activating the cementitious material to harden with a change in pH.

6. The method of claim 1, wherein the cementitious material comprises blast-furnace slag.

7. The method of claim 1, wherein the graphite material is deformable graphite particles.

8. The method of claim 1, wherein said drilling fluid further comprises a clay material.

9. The method of claim 8, wherein the clay material is prehydrated bentonite.

10. The method of claim 8, wherein the fibrous material, the graphite material and the clay in said drilling fluid participate in controlling loss of fluid from said wellbore.

11. The method of claim 1, wherein the weight of the drilling fluid is from about 8.5 lb./gal. to about 10 lb/gal.

12. A method for drilling a wellbore, which comprises the step of drilling through shallow water flows with a drilling fluid comprising:

a silicate material;

a plurality of cellulose microfibers;

a clay suspension;

deformable graphite particles; and a cementitious material which when deposited as part of a filter cake can be activated to harden and enhance the bonding of the filter cake to cement subsequently added to the wellbore.

13. The method of claim 12, wherein the drilling fluid further comprises hollow microspheres used to adjust the weight of the drilling fluid to about 10 lb/gal. or less.

14. The method of claim 13, wherein the hollow microspheres have a specific gravity from about 0.125 to about 0.6.

15. The method of claim 12, wherein the cementitious material is blast furnace slag.

16. The method of claim 12, wherein the silicate, microfibers, graphite particles, clay and cementitious material are incorporated into a filter cake which forms on the surface of the wellbore.

17. The method of claim 12, wherein the silicate, microfibers, graphite particles, clay and cementitious material participate in strengthening poorly consolidated formations.

18. A process for drilling and cementing a wellbore through shallow water flows, said process comprising:

(a) drilling and cementing a top portion of a well, the top portion being on top of a formation having shallow water flows;

(b) preparing a drilling fluid comprising a light weighting material including hollow microspheres lighter than water, said fluid weighing from about 8.5 lb./gal. to about 10 lb./gal.;

(c) drilling through the formation having shallow water flows using said drilling fluid, and (d) cementing the wellbore through the shallow water flows using a light weight cement, wherein the drilling fluid further comprises a fibrous material, a silicate material, a graphite material, and an activatable cementitious material at least a portion of which deposits on the wellbore surface comprising a filter cake during said drilling.

19. The process of claim 18, further comprising activating hardening of the cementitious material in the filter cake prior to said cementing.

* * * * *